(12) United States Patent
Yoshikawa et al.

(10) Patent No.: US 6,529,988 B1
(45) Date of Patent: Mar. 4, 2003

(54) METHOD AND APPARATUS FOR COMPRESSION OF UNIVERSAL SERIAL BUS DATA TRANSMISSION

(75) Inventors: Hiroto Yoshikawa, San Jose, CA (US); Masakazu Urade, Kyoto (JP)

(73) Assignee: Matsushita Electrical Industrial, Osaka (JP)

( * ) Notice: Subject to any disclaimer, the term of this patent is extended or adjusted under 35 U.S.C. 154(b) by 0 days.

(21) Appl. No.: 09/430,668

(22) Filed: Oct. 28, 1999

(51) Int. Cl.[7] .............................................. G06F 13/00
(52) U.S. Cl. ........................................ 710/305; 710/62
(58) Field of Search .......................... 710/68, 5, 105, 710/106, 62, 64, 305

(56) References Cited

U.S. PATENT DOCUMENTS

| | | | |
|---|---|---|---|
| 5,991,546 A | * 11/1999 | Chan et al. ................... | 710/313 |
| 6,151,653 A | * 11/2000 | Lin et al. ..................... | 710/305 |
| 6,279,045 B1 | * 8/2001 | Muthujumaraswathy et al. | 710/5 |
| 6,356,968 B1 | * 3/2002 | Kishon ......................... | 710/62 |

OTHER PUBLICATIONS

Inventra, Serial Communication, "M 85230 Enhanced Serial Communications Controller", Mentor Graphics, Corp., product information, 2 pgs.

Inventra, Serial Communication, "M 85C30 Serial Communications Controller", Mentor Graphics, Corp., product information, 2 pgs.

Panasonic Semiconductor, (1998), "MN5573 USB Hub Controller", product description, pp. 1–21.

Intel, "82930A Universal Serial Bus Microcontroller", at http://developer.intel.com/design/MCS51/PRODBREF/2897.htm, (May 17, 1999), 5 pgs.

* cited by examiner

*Primary Examiner*—Glenn A. Auve
(74) *Attorney, Agent, or Firm*—Morrison & Foerster LLP

(57) ABSTRACT

Disclosed is an apparatus and method for transferring data from a directly from peripheral computer device to a computer via a universal serial bus. The disclosed method and apparatus can also compress the transferred data. The apparatus can include a Serial Interface Engine (SIE) connected with the computer and having a latch and a First-In-First-Out memory (FIFO) connected to the latch of the SIE. The FIFO temporarily stores data from the peripheral computer device and transfers the data to the latch of the SIE. A read input of the latch is driven at a first clock frequency and an output of the FIFO is driven at a second clock frequency. The second clock frequency is at least intermittently higher than the first clock frequency. Thus, a portion of the data placed on the output of the FIFO at the second clock frequency is not read into the latch. This allows data to be compressed as it is transferred from the FIFO to the SIE.

17 Claims, 5 Drawing Sheets

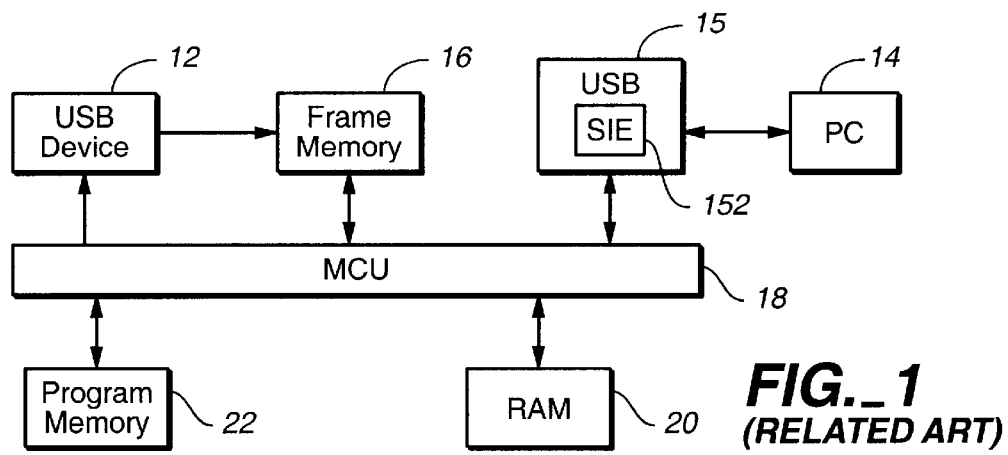
FIG._1
(RELATED ART)
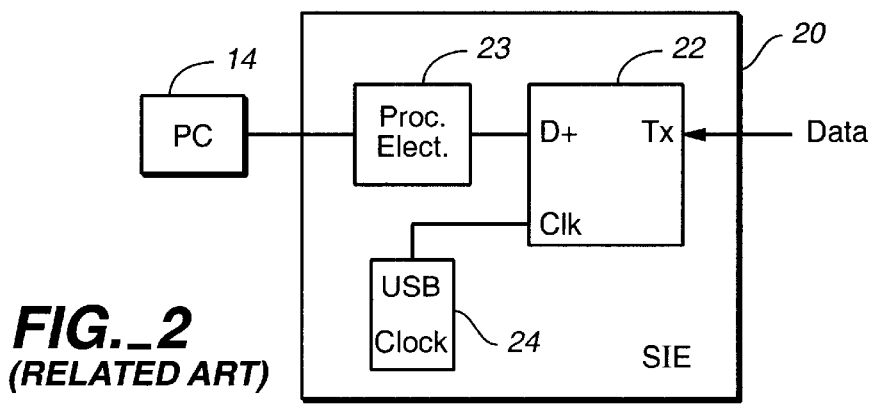
FIG._2
(RELATED ART)
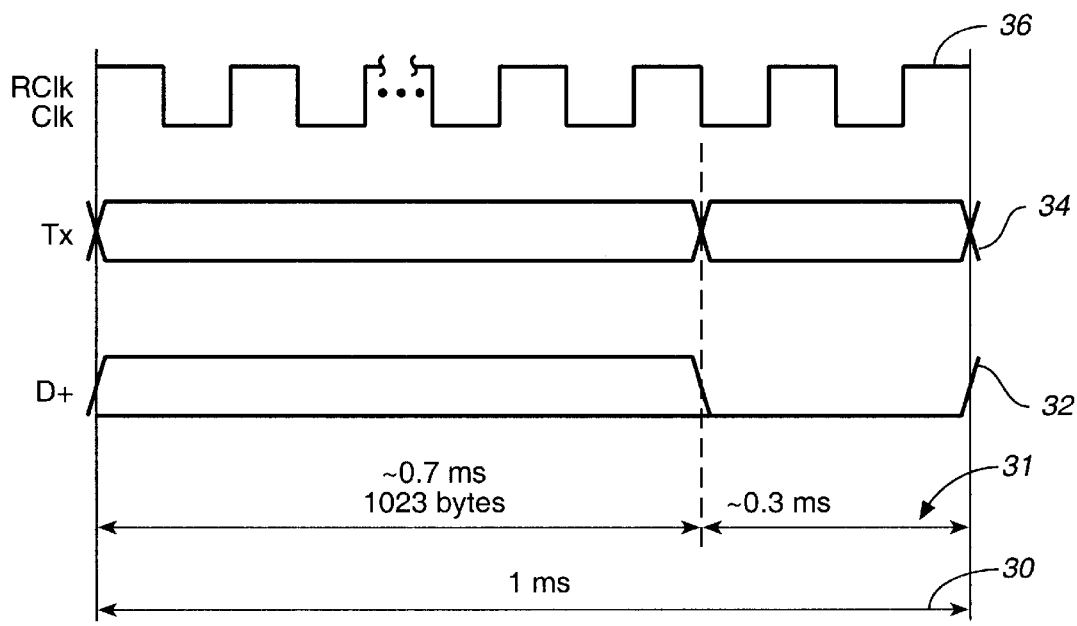
FIG._3
(RELATED ART)

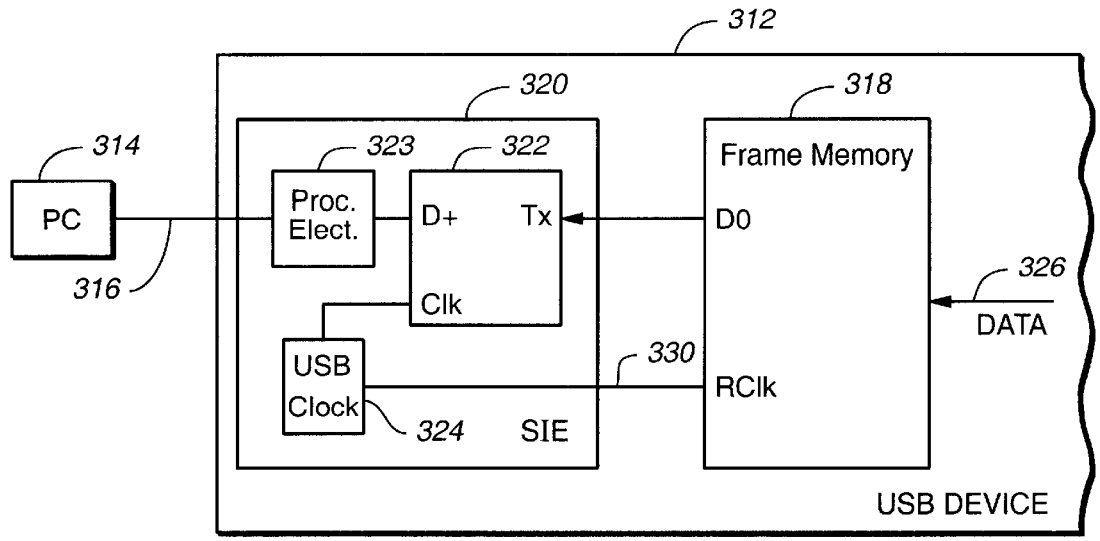
FIG._4
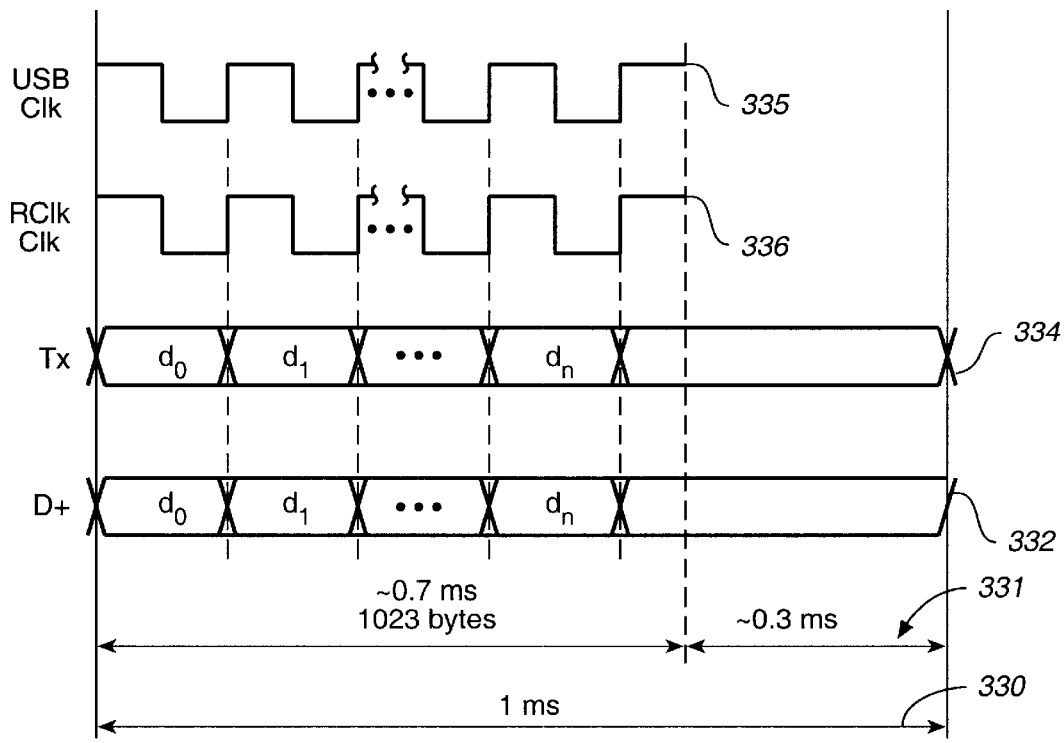
FIG._5

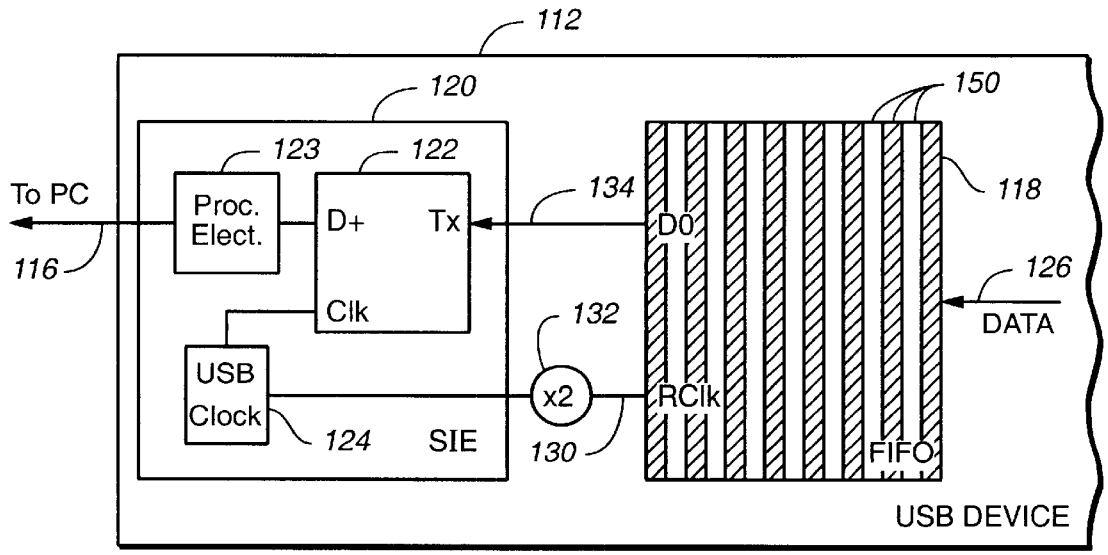
FIG._6
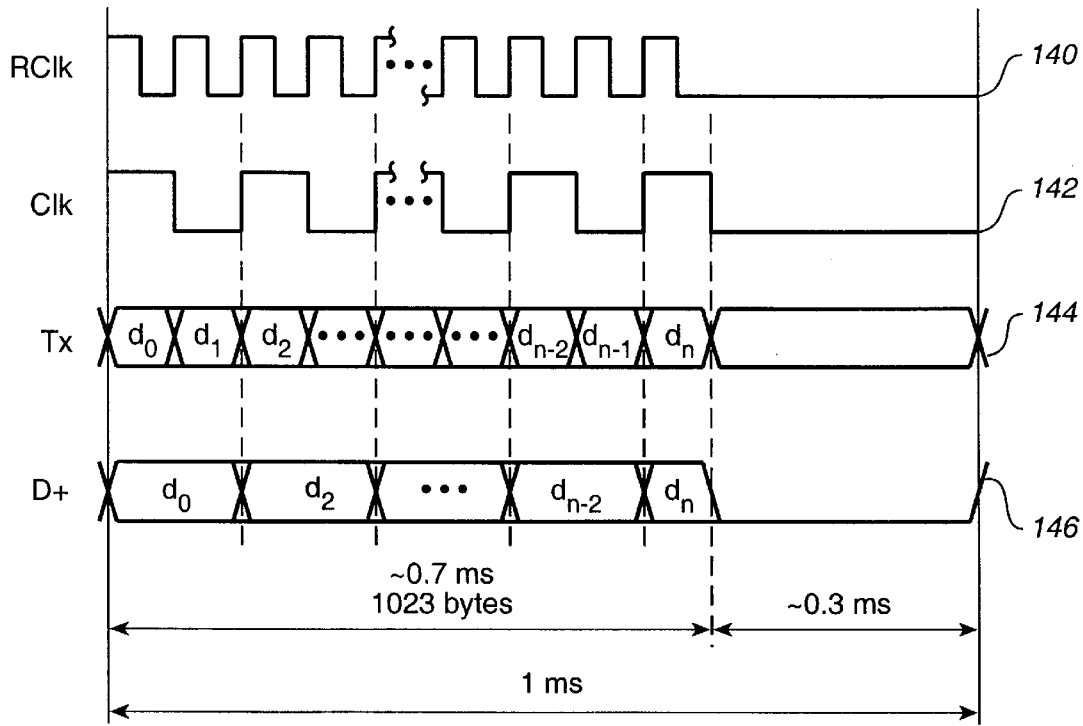
FIG._7

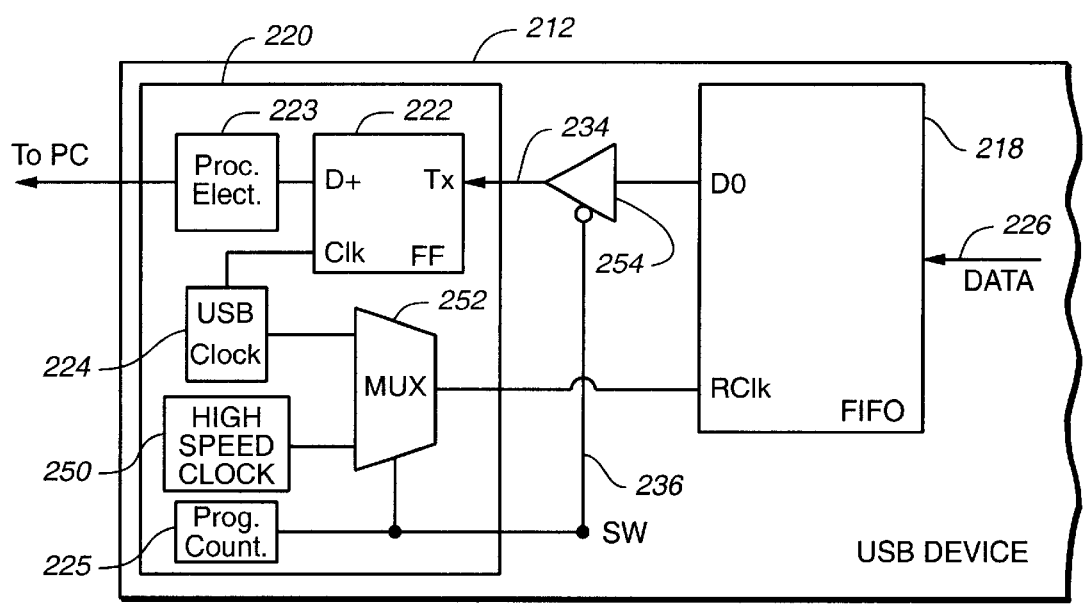
FIG._8

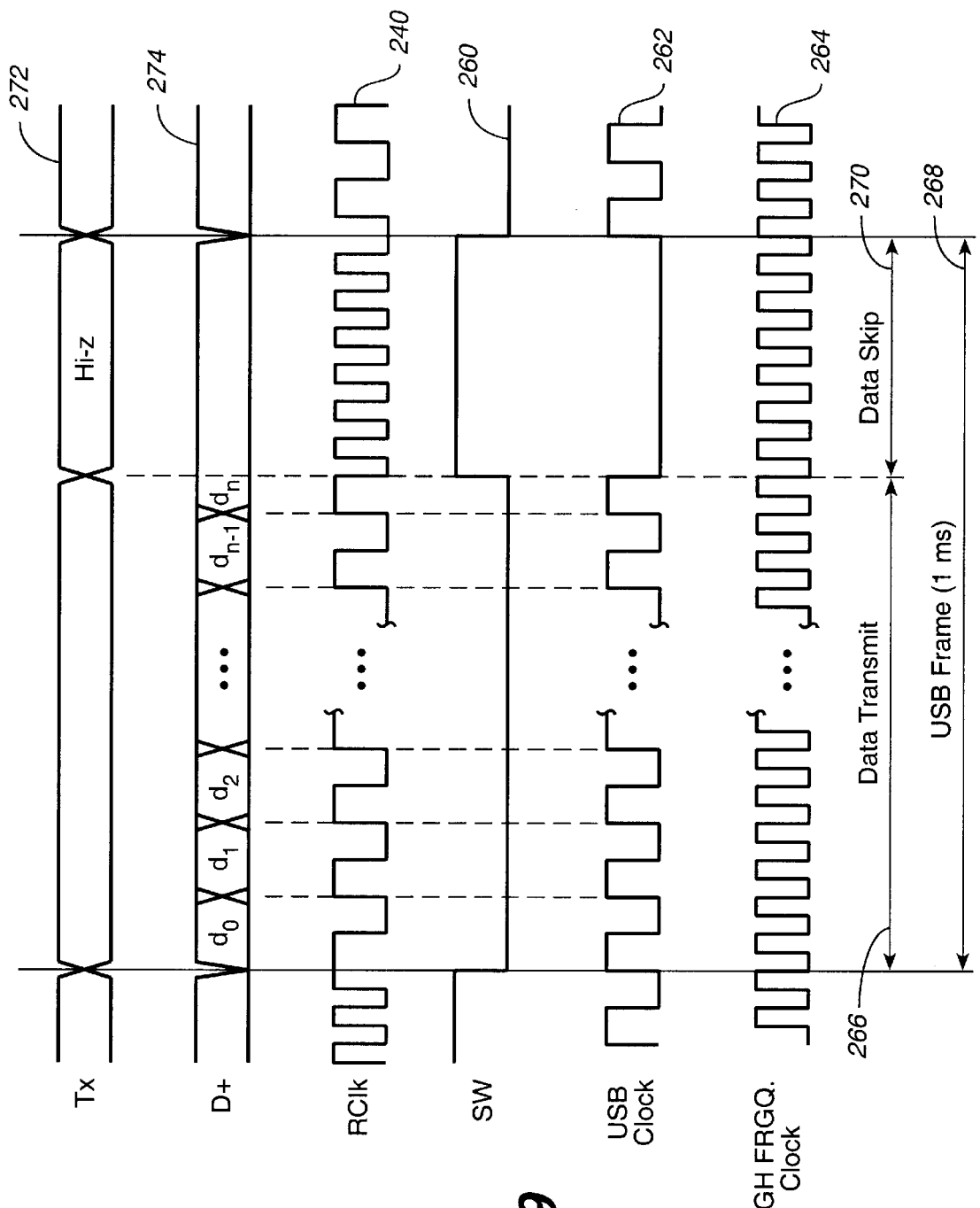
FIG._9

METHOD AND APPARATUS FOR COMPRESSION OF UNIVERSAL SERIAL BUS DATA TRANSMISSION

TECHNICAL FIELD

The present invention is directed to relatively high speed transfer of data from a universal serial bus peripheral device to a personal computer. In particular, the present invention includes a method and apparatus for compression of data transferred over a universal serial bus.

BACKGROUND OF THE INVENTION

The universal serial bus (USB) is a computer bus architecture used for connection of information processing devices, such as peripheral computer devices to a personal computer (PC). For a number of reasons, use of a USB in peripheral device interconnection has become desirable. First, a wide range of information processing devices can be interconnected to other information processing devices, such as PCs, via the USB. For example, a PC's keyboard, mouse, printer, scanner, modem, audio devices and video devices, can all be connected via the USB. Also, the USB allows connection of these and other peripheral devices using only a single connector type. Additionally, device attachment is automatically detected by the USB and software automatically configures the device for immediate use, without user intervention.

FIG. 1 is a schematic diagram showing an earlier data transfer configuration in a USB/PC interconnection. A USB device 12 can be a keyboard, mouse, video device such as a CCD camera, or any other peripheral information processing device which can be connected wit a PC 14 via a USB 15. A frame memory 16 is typically interconnected to USB device 12 to receive and temporarily store data therefrom. Frame memory 16 can be, for example, a first-in first-out memory (FIFO). A main control unit (MCU) 18 or central processing unit is connected to and controls the operation of the USB device 12, the frame memory 16 and the USB 15. It is also possible that a random access memory RAM 20 and program memory 22 be interconnected with the MCU. The RAM 20 and program memory 22 can be used for data compression as will be explained below. USB 15 includes a serial interface engine (SIE) 15a. SIE 15a transfers data initially generated by USB device 12 to PC 14.

To capture data from USB device 12 and transfer the data to PC 14, MCU 18 controls USB device 12 to capture the data. USB device 12 then transfers the data to frame memory 16. MCU 18 then takes the data from frame memory 16 and transfers it SIE 15a for transfer to PC 14. As shown in FIG. 2, SIE 15a includes a flip-flop 22, a USB clock 24 and processing electronics 23. The USB data is latched through input TX and output D+ of flip-flop 22 to processing electronics 23 for USB protocol processing and transfer to the PC 14. USB clock 24 sets the rate for latching data through to processing electronics 23.

USB clock can run at either a "slow" speed of about 1.5 MHz or a "fast" speed of about 12 MHz. The speed at which USB clock 24 is run depends upon the nature of USB device 12. For example, a typical keyboard or mouse would probably be run at 1.5 MHz while a typical video camera would probably be run at 12 MHz. In the data transfer configuration shown in FIG. 1, on each USB clock cycle, data is read from TX input of flip-flop 22 and transferred to D+ output of flip-flop 22. Processing electronics 23 reads data off the D+ output and, ultimately, the data is transferred to PC 14. FIG. 3 is a timing diagram showing the signals 32, 34, and 36 at D+, TX and USB CLK, respectively.

One of the tasks accomplished by processing electronics 23 is to place the USB data in "frames." As shown in FIG. 3, under USB protocol, a frame 30 is a 1 millisecond (ms) interval in which data is transferred from the USB 15 to a PC 14. However, also under USB protocol, each frame ordinarily can contain a maximum of 1023 bytes of data. When USB device 20 transmits 1023 bytes of data every frame, the remainder of the frame is ordinarily not used for data transfer. Thus, as shown by arrows 31, running at 12 MHz, about 0.7 ms of the frame is used for data transfer while the remaining 0.3 ms is not.

It is often desirable that data from a peripheral device be transmitted relatively quickly to the PC to which the device is attached. And, in many cases, a relatively high transmission speed is desirable even at the expense of some resolution in the data. That is, it can be desirable to compress transferred data by discarding some data in order to gain speed in data acquisition. This can be the case, for example, when acquiring video or audio data from a peripheral device. In these types of signals, it is likely that a relatively lower transmission speed will have a greater effect on the ultimate quality of a sound or image than will relatively less, or reduced resolution, data.

Accordingly, it can be desirable to provide for compression of data from USB device 12 prior to routing data to PC 14. In the earlier data transfer circuit shown in FIG. 1, data compression is achieved through the use of RAM 20 and software stored in program memory 22. Data received from USB device 12 can be transferred to RAM 20 by MCU 18. A compression program stored in program memory 22 can then operate to compress data stored in RAM 20 and MCU 18 can then transfer the compressed data to USB 15. Generally, the compression program will act to remove some USB device data from that placed in RAM 20. Thus, because there is less data to transfer to PC 14, the transfer can take place more rapidly, facilitating a higher quality of sound or image to PC 14.

However, there are a number of drawbacks in use of the data transfer system shown in FIG. 1. First, even if data from USB device 12 is not being compressed, this data must be routed through MCU 18 prior to being fed into USB 15. This can result in relatively slow transmission time. And, as noted above, relatively high transmission time can be advantageous when the USB device generates an audio or video signal. Additionally, using software to compress data before feeding the data into the SIE requires additional processing time.

As this discussion makes clear, there is need for improvement in transmission and compression of data from a peripheral computer device to a PC via a USB. Specifically, data compression should be able to be completed without additional processing time to facilitate relatively high transmission rates.

SUMMARY OF THE INVENTION

The present invention provides a hardware method an apparatus for transmission and compression of data from a USB device to a computer. The data transmission method transmits data directly from a data output of the USB device to a serial interface engine if the USB. In this way, data can be advantageously transferred relatively rapidly from the USB device to the computer. A data compression method and apparatus in accordance with the present invention achieves data compression without additional overhead processing time. Thus, data transfer speed acquired through data compression is not sacrificed due to added processing time.

The present invention includes an apparatus for transferring data from a first information processing device to a second information processing device via a universal serial bus (USB). The apparatus includes a serial interface engine (SIE) connected to the second information processing devices. The SIE is for transferring data from the first information processing device to the second information processing device. A data output, which outputs data at a given clock rate, is interconnected with the first information processing device. A latch is connected with the SIE and directly connected the data output. The latch is for reading data transferred from the data output of the first information processing device into the SIE at a given clock frequency. At least one clock generator drives the latch such that data is transferred directly from the data output of the first information processing device to the SIE.

By directly transferring data from the data output to the SIE, without first passing the data through a main control unit (MCU) or central processing unit (CPU), relatively rapid data transfer is facilitated between the USB device and the computer. This can advantageously result in a relatively higher quality signal being transmitted from the USB device to the computer.

Another aspect of the present invention includes an apparatus for compressing data transferred from a first information processing device, such as a computer peripheral device, to a second information processing device, such as a computer, via a USB. The apparatus includes a serial interface engine (SIE) for connection to the second information processing device and transferring data from the first information processing device to the second information processing device. The apparatus also includes a first-in-first-out memory (FIFO) interconnected to the SIE and for storing and transferring data from the first information processing device to the SIE. The FIFO includes a data output for outputting data at a given clock frequency. A latch is interconnected with the SIE and the FIFO and reads data transferred from the FIFO into the SIE at a given clock frequency. A first clock generator drives the latch at a first frequency and a second clock generator at least intermittently drives the data output of the FIFO at a second frequency which is higher than the first frequency. When the output of the FIFO is driven at the second frequency, data is transmitted from the FIFO at a higher rate than is read by the latch.

In another aspect of the present invention, the output of the FIFO is driven only intermittently at the second frequency. Additionally, a buffer is placed between the FIFO and the latch. The buffer blocks transmission of data from the FIFO to the latch during the period of time when the output of the FIFO is driven at the second frequency. In this way, data can be dumped from the FIFO at whatever rate is desired and not latched into the SIE.

In yet another aspect of the present invention, a method of compressing data transferred from a first information processing device to a second information processing device via a USB includes temporarily storing data generated by the first information processing device in a FIFO which has a read output. Portions of the data are read from the read output of the FIFO into the input of a latch of an SIE. The SIE is for transferring the data to the second information processing device. The input of the latch is driven at a first clock frequency and the data output of the FIFO is driven at a second clock frequency which is at least intermittently different than the first clock frequency.

When the output of the FIFO is driven at a higher clock frequency than the input of the latch, some of the data stored by the FIFO is lost and the total amount of data transferred from the FIFO to the SIE is less than the amount of data generated by the first information processing device and stored in the FIFO. For example, if the output of the FIFO is driven at twice the frequency of the latch, then only half the data stored in the FIFO will be read into the SIE. This reduces the total amount of data transferred from the FIFO to the SIE which, in turn, advantageously reduces the total amount of time required to transfer the USB data. This can be accomplished without sacrificing any of the time reduction to processing overhead.

BRIEF DESCRIPTION OF THE DRAWINGS

FIG. 1 is a block diagram showing an earlier method and apparatus for transferring data from a USB device to a personal computer (PC).

FIG. 2 is a block diagram showing a serial interface engine which can be used with the data transfer method and apparatus shown in FIG. 1.

FIG. 3 is a timing diagram illustrating a frame of data generated by the method and apparatus shown in FIG. 1.

FIG. 4 is a block diagram showing a method and apparatus for transferring data from a USB device to a personal computer in accordance with the present invention.

FIG. 5 is a timing diagram illustrating the logical timing of the method and apparatus shown in FIG. 4.

FIG. 6 is a schematic diagram showing a second embodiment of a method and apparatus for compressing data transferred from a USB device to a personal computer in accordance with the present invention.

FIG. 7 is a timing diagram illustrating the logical timing of the method and apparatus shown in FIG. 6.

FIG. 8 is a schematic diagram showing a second embodiment of a method and apparatus for compressing data transferred from a USB device to a personal computer including a multiplexer and a high speed clock in accordance with the present invention.

FIG. 9 is a timing diagram illustrating the logical timing of the method and apparatus shown in FIG. 8.

DETAILED DESCRIPTION

In the following description, well known systems are shown in diagrammatical or block diagram form in order not to obscure the present invention unnecessarily.

The present invention provides a method and apparatus for direct transmission of data from a USB peripheral computer device to serial interface engine (SIE), which formats and transfers the USB data to a PC, without first routing such data through a main control unit (MCU) or central processing unit (CPU). In accordance with the present invention, the frame memory, which can temporarily store data generated by a USB device, is directly connected via a data line to an SIE. Preferably, the frame memory is connected to a flip-flop connected to the SIE which latches the USB data through the SIE. By directly connecting a frame memory temporarily storing USB data to an SIE, USB data can be transferred relatively more rapidly from the USB peripheral device to the PC. This can advantageously result in a relatively higher signal quality USB signal received in the PC.

FIG. 4 is a schematic diagram showing a method and apparatus for compressing data in a USB peripheral device in accordance with the present invention. FIG. 4 shows a Universal Serial Bus (USB) device 312 which includes a frame memory for temporarily storing data generated by USB device 312. In the embodiment shown in FIG. 4, the frame memory is a first-in-first-out memory (FIFO) 318 but can also be any other device which will temporarily store data generated by a USB peripheral device. USB device 312 also includes a Serial Interface Engine (SIE) 320 for transferring data from FIFO 318 to a PC 314. USB device 312 can be any information processing device which can transfer data to a second information processing device such as personal computer (PC) 314 via a USB. Preferably, USB device 312 is a high speed USB device such as a video or audio device. SIE 320 preferably includes a flip-flop 322, a USB clock 324 and additional processing electronics 323.

FIFO 318 is for temporarily storing data generated by USB device 312 and includes a data input line 326 through which the USB device 312 inputs data into FIFO 318. FIFO 318 also includes a data output DO, which is connected to data line 334; and a clock input RCLK, which is connected to line 330. The clock signal at clock input RCLK regulates how quickly data is placed on data output DO. Preferably, 1 byte of data is placed on output DO on each clock cycle at clock input RCLK.

Preferably, flip-flop 322 includes data input TX, data output D+, and clock signal input CLK. FIG. 5 is a timing diagram showing the timing of a 1 ms interval, as shown by arrow 330, of data transfer from FIFO 318 to flip-flop 322 of SIE 318. USB clock drives both the CLK input of flip-flop 322 and RCLK input of FIFO 318. Thus, as shown by USB CLK signal 335 and RCLK CLK signal 336, both the RCLK input of FIFO 328 and the CLK input of flip-flop 320 are driven at the same rate. Additionally, output DO is preferably directly connected to input TX of SIE 320. Thus, as shown by TX signal 334 and RCLK CLK signal 336 of FIG. 5, on each rising edge of RCLK CLK signal 336, data is transferred to input TX from output DO. As shown by D+ signal 332, data on input TX of FIFO 318 is latched through to data output D+ on each rising edge of USB clock signal 335. Data on output D+ is read by processing electronics 323.

Among other functions, processing electronics 323 places data from output D+ into 1 ms frames and transmits the 1 ms frames to PC 314 or other information processing device. The function and components of processing electronics 323 is well known by those skilled in the art. As discussed in the Background section, only a portion of the 1 ms frame is used from data transfer. Thus, preferably, as shown by arrows 331 in FIG. 5, approximately 0.7 ms of a single frame is used for data transfer and the remaining 0.3 ms is not used for data transfer. Thus, preferably, as shown by USB CLK signal 335 and RCLK CLK signal 336, during the 0.3 ms time period of each frame when data is not being transferred to PC 14, USB clock 324 generates no signal. It is also contemplated that other time period could be used to skip data. For example, it is within the ambit of the present invention for a shorter period than 0.7 ms be used for data transfer and a longer period which is not used for data transfer. The period not used for data transfer could, intermittently, be as long as the full 1 ms period. Up to this amount of time, then, could be used to skip data.

Using a data transfer period of less than 0.7 ms would allow, information data packets to be sized smaller than 1023 bytes. For example, a data packet size could be 64 bytes. This would allow many smaller data transfer packets within the 1 ms frame period. This would also allow multiple, shorter periods of skipped data within the 1 ms frame period. That is, their could be multiple data skip periods between multiple data transfer periods in the 1 ms frame period. Further, these multiple data skip and data transfer periods could vary in size. For example, the data skip periods might be 0.5 ms, 0.1 ms or any other period up to 1 ms. This would also be the case for data transfer periods.

Additionally, though the background section notes that a USB clock typically runs at either 1.5 MHz or 12 MHz, it is within the ambit of the present invention to run the USB clock at any other frequency including up to 200 MHz or higher.

As discussed above, the method and apparatus of USB data transfer of the present invention transfers data from a FIFO 318, where data generated from USB device 312 is temporarily stored, directly to SIE 320 without first passing through an MCU. By eliminating the need to pass the data through an MCU, USB device data can be more rapidly transferred from USB device 312 to SIE 320 and ultimately to PC 314. As discussed in the background section, slower data transfer of data from, for example, a video or audio signal generating peripheral device can result in relatively lower quality signal reproduced in PC 314. Thus, the relatively more rapid data transfer method and apparatus of the present invention can advantageously facilitate a higher quality data signal reproduced in PC 314, particularly when the data being transferred consists of a video or audio signal.

FIG. 6 shows a second embodiment of a USB device for transferring data from a USB device to a PC on a USB. FIG. 6 shows a USB 112 device which includes and FIFO 118 and an SIE 120. FIFO 118 and SIE 120 are preferably substantially the same as FIFO 318 and SIE 320, respectively, shown in FIG. 4. FIFO 118 is for temporarily storing data generated by the USB peripheral device 112 and SIE 120 is for transferring data temporarily stored in FIFO 118 to a PC (not shown).

Additionally, in USB device 112, flip-flop 122 and FIFO 118 can be regulated at different clock rates. In the embodiment shown in FIG. 6, line 130 interconnecting USB clock 124 with the RCLK input of FIFO 118 includes a frequency multiplier circuit 132. Preferably, frequency multiplier circuit 132 multiples the rate of USB clock 124 by two. In this way, FIFO 118 is regulated at twice the frequency of flip-flop 122. As USB device 312, USB device 112 is preferably a high speed USB device. Thus, in the embodiment shown, USB clock has a frequency of approximately 12 MHz and FIFO 118 is run at a frequency of approximately 24 MHz. As noted above, however, it is also contemplated to run the USB clock at any other frequency up to 200 MHz or higher. Thus, FIFO 118 may also be run at a frequency higher than 24 MHz.

Data can be fed into FIFO 118 through data line 126 at any speed and is preferably fed at a rate higher than the clock rate of RCLK, that is, higher than about 24 MHz. Thus, if RCLK is approximately 24 MHz, then USB data is preferably fed into FIFO 118 at a rate above 24 MHz and FIFO 118 will temporarily store USB data.

In FIG. 6, bytes 150 of data stored in FIFO 118 are represented as horizontal segments in the box representing FIFO 118. FIG. 7 is a timing diagram showing the timing of a 1 ms interval of data transfer from FIFO 118 to flip-flop 122 of SIE 120. Each clock cycle of RCLK signal 140 causes a byte 150 of data stored in FIFO 118 to be placed on output DO. Each clock cycle of CLK signal 142 causes input TX of flip-flop 122 to latch the data on output DO to flip-flop output D+. TX signal 144 and D+ signal 146 are also shown on FIG. 7. Because the frequency of RCLK signal 140 is about twice that of CLK signal 142, FIFO 118 will put two bytes of data onto output DO for every one byte of data latched by flip-flop 122. Thus, every other byte 150 of data put on output DO of FIFO 118 will not be latched to output D+, and will be lost. This is represented schematically in FIG. 6; only shaded bytes 150 of data in FIFO 118 will be latched by flip-flop 122 to output D+ to be processes by processing electronics 123 and transmitted to the PC. Thus, every other byte of data stored in FIFO 118 will be removed from the data that is ultimately sent to the PC or other information processing device.

Such a compression technique can be used in situations where resolution of data is less critical than speed of transmission of the data. For example, USB 112 could be a source of a video signal such as a video camera or video tape player. If each horizontal scan line of the video signal were 1 byte, then, using the data compression method and apparatus of the present invention, every other scan line would be removed from the video signal. Removal of every other scan line from a video signal would probably not significantly effect the resulting video image. However, particularly when the video signal includes fast moving objects, the speed with which the video signal is processed could be important. For example, a relatively fast moving object reproduced in a video image which was processed relatively slowly might not be accurately reproduced.

By eliminating every other byte of data stored in FIFO 118, the data from USB device 112 is compressed, and transfer of the data to the PC can be accomplished relatively more quickly than if the data were not compressed. Additionally, compressing data from USB device 112 in the manner described above advantageously does not introduce any additional delay into the transmission of the USB device data to the PC.

In the embodiment shown in FIG. 6, frequency multiplier 132 multiplies the USB clock 124 signal by two. It is also contemplated to multiply the USB clock signal by any other integer or non-integer to compress USB device data. For example, USB clock 124 signal could be multiplied by 4 so that only every 4th byte stored in FIFO 118 would ultimately be received by the PC. It is also contemplated to regulate FIFO 118 by using a separate clock rather than multiplying the USB clock 124 signal.

A second embodiment of a USB data compression method and apparatus in accordance with the present invention is shown schematically in FIG. 8. USB device 212 can be an information processing device such as a computer keyboard, video camera, audio recorder or other computer peripheral device. USB device 212 preferably includes a FIFO 218, for temporarily storing USB device data, and an SIE 220 for processing USB device data latched from FIFO 218 and transferring the processed USB device data to a PC or other second information processing device which can be a PC (not shown). SIE 220 preferably includes a flip-flop 222, USB clock 224, processing electronics 223, high speed clock 250, multiplexer (MUX) 252, and program counter 225. USB device 212 also preferably includes a tri-state buffer 254 in line 234, which is the data line that interconnects FIFO 218 to SIE 220. Tri-state buffer 254 is controlled by switch (SW) input line 236 which also controls MUX 252. FIFO 218 is substantially the same as FIFO 118 and flip-flop 222 is substantially the same a flip-flop 122.

FIG. 9 is a timing diagram showing the operation of USB device 212. Data from USB device 212 is fed into FIFO 218 via data line 226 and temporarily stored in FIFO 218, preferably in one byte parcels. Preferably, one byte of data is placed on output DO of FIFO 218 on each clock cycle of RCLK signal 240 at clock input RCLK of FIFO 218. The control input to tri-state buffer 254 is inverted. Thus, if SW input line signal 260 is low then the data on FIFO output DO is passed through tri-state buffer 254 to input TX of flip-flop 222. Additionally, MUX 252 is configured such that if SW input line signal 260 is low, then the USB clock input is selected and the USB clock signal 262 regulates both flip-flop 222 and output DO of FIFO 218. Flip-flop 222 latches the data on input TX through to flip-flop 222 output D+ on each clock cycle of USB clock signal 262. In this way, when SW signal 260 is low, each byte of USB device data placed on output DO of FIFO 218 is latched through to output D+ of flip-flop 222 and, thus, to processing electronics 223. Processing electronics 223, which is substantially the same as processing electronics 123, processes the USB device data into frames and transmits the data to the PC or other information processing device.

The data transfer circuitry of USB 212, however, operates differently if SW input line signal 260 is high. First, when SW input line signal 260 is high, tri-state buffer 254 blocks data on output DO from passing to input TX. Second, high speed clock input to MUX 252 is selected and, as shown in FIG. 9, RCLK is driven by the high speed clock signal 264. Thus, USB device data stored in FIFO 218 is placed on output DO at the high speed clock rate and is dumped because tri-state buffer blocks the data from being transmitted to input TX of flip-flop 222.

As noted in the background section, generally, only a portion of a frame 268 is available for use to transmit data to a PC. Thus, as shown in FIG. 9, SW signal 260 can be intermittently low and then high. Specifically, signal 260 can be low during the data transmit phase 266 of USB frame 268, and high during the data skip phase 270 of USB frame 268. In this way, USB device data can be dumped during a time when no data would be transmitted to the PC anyway. As shown in FIG. 8, a programmable counter 225 of SIE 220 can be used to generate SW signal 260. Programmable counter 225 can be configured to generate a high signal during times in which no data is transferred to the PC and a low signal during times in which data is transferred to the PC. SW signal 260 can also be generated in any other manner. The frequency of high speed clock 250 can be set to dump as much or as little USB device data as is desired during the data skip phase 270. The higher the frequency, the more data that gets dumped. This is only limited by the speed with which FIFO can be driven to place data on output DO. The frequency of high speed clock 250 can also be set at, or lower than, the USB clock signal. As noted above, the USB clock can be run at any frequency, including up to 200 MHz or higher.

Compression of USB device data in this way avoids the need to store and then transmit at a later time USB device data which would otherwise be transmitted during data skip phase 270 if data skip phase 270 was not necessary under USB protocol. Accordingly, a backup or bottleneck of USB device data can be avoided. This can advantageously save time in USB device data transmission. This compression scheme is useful to compress computer peripheral device signals for which it is not critical to process all the data generated by the device, such as audio and video signals.

It will be understood that the foregoing is merely illustrative of the principles of this invention, and that various modifications can be made by those skilled in the art without departing from the scope and spirit of the invention.

What is claimed is:

1. An apparatus for transferring data from a first information processing device to a second information processing device via a universal serial bus (USB), the apparatus comprising:
   a serial interface engine (SIE) interconnected for communication with the second information processing device, the SIE for transferring data from the first information processing device to the second information processing device;
   a data output interconnected with the first information processing device and for outputting data at a given clock frequency;
   a latch interconnected with the SIE and directly interconnected with the data output of the first information processing device, the latch for reading data transferred from the data output of the first information processing device into the SIE at a given clock frequency;
   at least one clock generator for driving the latch such that data is transferred directly from the data output of the first information processing device to the SIE.

2. The apparatus of claim 1 wherein the data output interconnected with the first information processing device includes a first-in-first-out memory (FIFO) for storing and transferring data from the first information processing device to the SIE, and the at least one clock generator drives both the latch and the FIFO to transfer data directly from the FIFO to the latch.

3. The apparatus of claim 2 further including a frequency multiplier interconnected with the FIFO and the clock generator such that the FIFO is clocked at a higher frequency that the latch and data is transmitted from the FIFO at a higher rate than is read by the latch.

4. An apparatus for compressing data transferred from a first information processing device to a second information processing device via a universal serial bus (USB), the apparatus comprising:
   a serial interface engine (SIE) for communication with the second information processing device and for transferring data from the first information processing device to the second information processing device;
   a first-in-first-out memory (FIFO) interconnected for communication with the SIE and for storing and transferring data from the first information processing device to the SIE, the FIFO including a data output for outputting data at a given clock frequency;
   a latch interconnected with the SIE and the FIFO, the latch for reading data transferred from the FIFO into the SIE at a given clock frequency;
   a first clock generator which drives the latch at a first frequency
   a second clock generator which at least intermittently drives the data output of the FIFO at a second frequency which is higher than the first frequency such that when the FIFO is driven at the second frequency, data is transmitted from the FIFO at a higher rate than is read by the latch.

5. The apparatus of claim 4 wherein the second clock generator continuously drives the FIFO at the second frequency.

6. The apparatus of claim 5 wherein the second frequency is an integer multiple of the first frequency.

7. The apparatus of claim 6 wherein the second frequency is approximately twice the first frequency.

8. The apparatus of claim 7 wherein the second clock generator is a circuit that multiplies a first clock signal produced by the first clock generator by a factor of approximately two.

9. The apparatus of claim 4 wherein:
   the FIFO is driven at the second frequency only intermittently; and
   the first information processing device includes a buffer between the FIFO and the latch which blocks data transmission from the FIFO to the latch when the FIFO is driven at the second frequency.

10. The apparatus of claim 4 wherein the first information processing device is a computer peripheral device and the second information processing device is a computer.

11. An apparatus for compressing data transferred from a first information processing device to a second information processing device via a Universal Serial Bus (USB), the apparatus comprising:
   a Serial Interface Engine (SIE) for communication with the second information processing device and for transferring data from the first information processing device to the second information processing device;
   a First-In-First-Out (FIFO) memory attached to the SIE and for storing and transferring data from the first information processing device to the SIE;
   a latch interconnected with the SIE and the FIFO, the latch including an input which reads the data transferred from the FIFO into the SIE;
   a first clock generator which drives the input of the latch at a first frequency
   a second clock generator which intermittently drives the FIFO at a second frequency which is different from the first frequency such that when the FIFO is driven at the second frequency, data is transmitted from the FIFO at a different rate than is read by the latch; and
   a buffer between the FIFO and the latch which blocks data transmission from the FIFO to the latch when the FIFO is driven at the second frequency.

12. The apparatus of claim 11 wherein the second frequency is higher than the first frequency.

13. A method of compressing data transferred from a first information processing device to a second information processing device via a universal serial bus (USB) comprising:
   temporarily storing data generated by a first information processing device in a first-in-first-out memory (FIFO) which includes a read output;
   reading portions of the data from the read output of the FIFO into an input of a latch of a serial interface engine (SIE) which is for transferring the portions of the data to the second information processing device;
   driving the input of the latch and FIFO at a first clock frequency to transfer data directly from the FIFO to the latch.

14. A method of compressing data transferred from a first information processing device to a second information processing device via a universal serial bus (USB) comprising:
   temporarily storing data generated by a first information processing device in a first-in-first-out memory (FIFO) which includes a read output;
   reading portions of the data from the read output of the FIFO into an input of a latch of a serial interface engine (SIE) which is for transferring the portions of the data to the second information processing device;

driving the input of the latch at a first clock frequency; and at least intermittently driving the data output of the FIFO at a second clock frequency which is different from the first clock frequency.

15. The method of claim 14 wherein the step of driving the read output of the FIFO at the second clock frequency includes continuously driving the read output of the FIFO at the second clock frequency which is higher than the first clock frequency.

16. The method of claim 15 wherein the step of driving the read output of the FIFO at the second clock frequency includes continuously driving the read output of the FIFO at the second clock frequency which is about twice the first clock frequency.

17. The method of claim 16 including the additional step of blocking transmission of data from the output of the FIFO to the input of the latch during a period of time in which the second clock frequency is higher than the first clock frequency.

* * * * *